(12) United States Patent
Sen et al.

(10) Patent No.: US 12,045,283 B2
(45) Date of Patent: Jul. 23, 2024

(54) INGESTION SYSTEM FOR DISTRIBUTED GRAPH DATABASE

(71) Applicant: Microsoft Technology Licensing, LLC, Redmond, WA (US)

(72) Inventors: Indranil Sen, Sunnyvale, CA (US); Siddharth Shah, Pittsburgh, PA (US); Andrew M. Rodriguez, San Jose, CA (US); Shrinivas Sivakumar, Saratoga, CA (US); Tushar Goyal, Cupertino, CA (US); Kartik Sathyanarayanan, Sunnyvale, CA (US); Suruchi Shah, Milpitas, CA (US); Kenneth Y. Li, Sunnyvale, CA (US); Soyeon Ki, Mountain View, CA (US); Andrew Codispoti, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 215 days.

(21) Appl. No.: 17/357,925

(22) Filed: Jun. 24, 2021

(65) Prior Publication Data
US 2022/0414156 A1 Dec. 29, 2022

(51) Int. Cl.
*G06F 16/901* (2019.01)
*G06F 9/54* (2006.01)
(Continued)

(52) U.S. Cl.
CPC ............ *G06F 16/9024* (2019.01); *G06F 9/54* (2013.01); *G06F 16/212* (2019.01); *G06F 16/258* (2019.01)

(58) Field of Classification Search
None
See application file for complete search history.

(56) References Cited

U.S. PATENT DOCUMENTS 11,269,876 B1 * 3/2022 Basavaiah ................. G06F 8/77
2014/0280362 A1 9/2014 Henderson
(Continued)

FOREIGN PATENT DOCUMENTS

WO WO-2019143412 A1 * 7/2019

OTHER PUBLICATIONS

Jenkov, Jakob. "The Declarative Delusion." Published May 11, 2015. Accessed Aug. 31, 2023 from https://jenkov.com/tutorials/opinion/the-declarative-delusion.html (Year: 2015).*

(Continued)

*Primary Examiner* — Alex Gofman
*Assistant Examiner* — Umar Mian
(74) *Attorney, Agent, or Firm* — NICHOLSON DE VOS WEBSTER & ELLIOTT LLP

(57) ABSTRACT

The disclosed technologies are capable of reading ingestion configuration data for a client of a plurality of clients of a graph database, transforming the ingestion configuration data from a declarative representation into a graph representation of the ingestion configuration data, storing the graph representation of the ingestion configuration data in the graph database, providing the graph representation of the ingestion configuration data to a data service, where the data service comprises one or more of (i) a physical grouping of at least one computing device configured to store at least a portion of the graph database, (ii) a logical grouping of at least one computing device configured to store at least a portion of the graph database, or (iii) a combination of (i) and (ii).

20 Claims, 7 Drawing Sheets

(51) Int. Cl.
*G06F 16/21* (2019.01)
*G06F 16/25* (2019.01)

(56) References Cited

U.S. PATENT DOCUMENTS

| | | | |
|---|---|---|---|
| 2017/0139956 A1* | 5/2017 | Qiao | ................... G06F 16/11 |
| 2017/0373933 A1* | 12/2017 | Subramanian | .... G06F 16/24578 |
| 2019/0384774 A1 | 12/2019 | Chen et al. | |
| 2020/0349172 A1 | 11/2020 | Constandache et al. | |
| 2021/0349924 A1* | 11/2021 | Chattopadhyay | ..... G06F 16/332 |
| 2021/0385251 A1* | 12/2021 | Crabtree | ............... G06F 16/951 |

OTHER PUBLICATIONS

Cho, et al., "Partial Update: Efficient Materialized View Maintenance in a Distributed Graph Database", In Proceedings of IEEE 34th International Conference on Data Engineering, Apr. 16, 2018, pp. 1477-1488.

"International Search Report and Written Opinion Issued in PCT Application No. PCT/US22/029524", Mailed Date: Aug. 25, 2022, 14 Pages.

Tanase, et al., "System G Distributed Graph Database", In Repository of arXiv:1802.03057v1, Feb. 8, 2018, 14 Pages.

\* cited by examiner

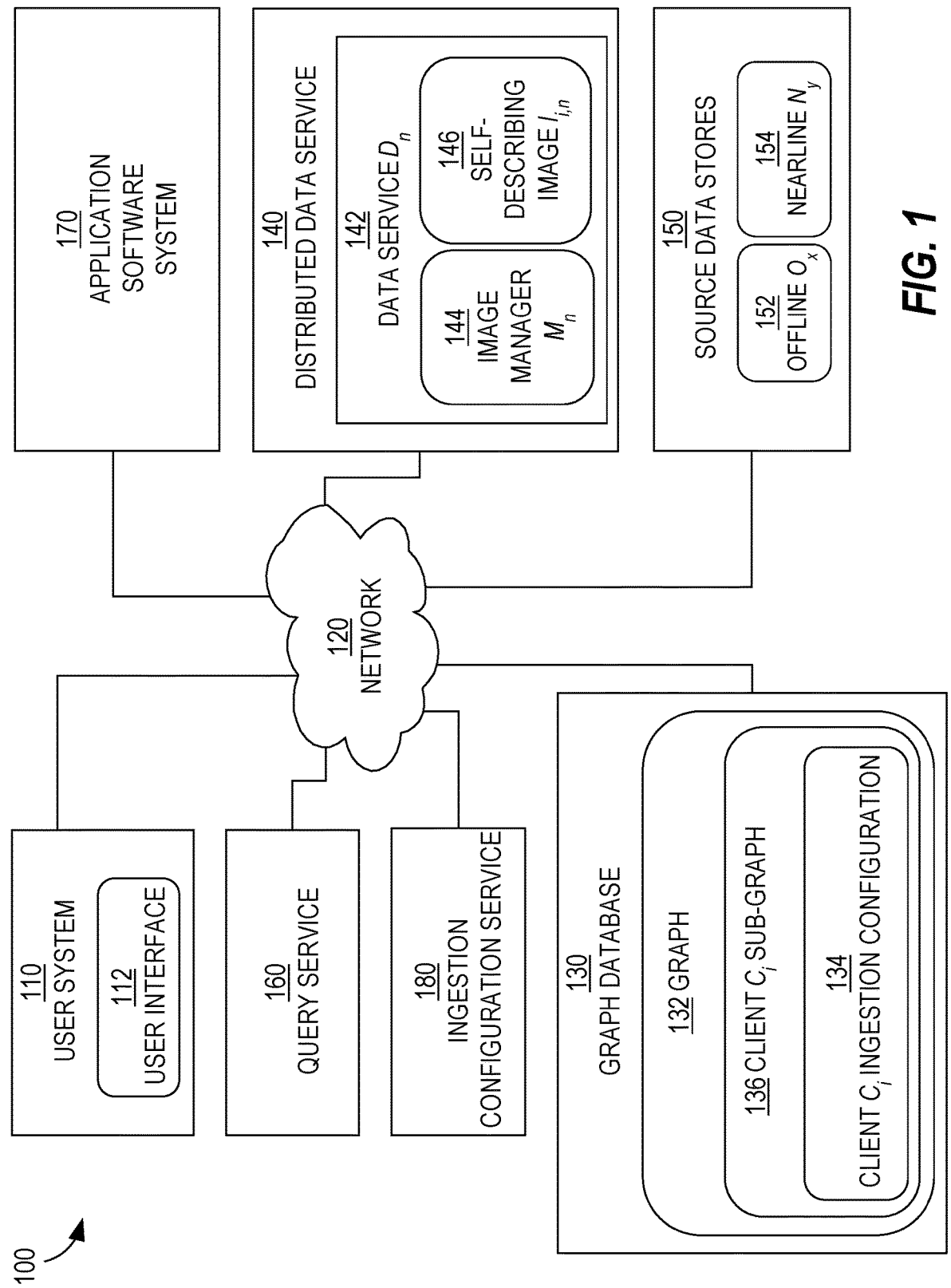

INGESTION SYSTEM FOR DISTRIBUTED GRAPH DATABASE

TECHNICAL FIELD

A technical field to which the present disclosure relates is data ingestion for distributed graph databases.

BACKGROUND

A distributed data processing system provides a software framework for distributed storage and processing of data on a large scale. A distributed software framework may store portions of a database across many different computers on a network. The distributed data processing system coordinates data create, read, write, update, and delete operations, query operations, and computations across the network of computers.

Indexes are used to quickly locate data in a database. Much like the index of a book identifies the pages on which particular words are printed, an index in the database context identifies the particular logical or physical storage locations of particular data items stored in the database. Indexes are created by a computer performing a build process. When data is added to or deleted from a database, or data in a database is updated, the indexes need to be correspondingly rebuilt. If data in a database changes frequently, the indexes may need to be rebuilt more often. In a distributed system, database changes and index rebuilds may be performed on one computer and then propagated across the network of computers in the distributed system.

There are different types of distributed database architectures including graph architectures and non-graph architectures. Examples of non-graph architectures include relational databases and key-value stores. In relational databases, data is organized according to a schema that includes tables and keys. A table stores data according to a logical arrangement of rows and columns. Keys are used to join data stored in different tables together. A structured query language (SQL) is used to construct and execute queries and to create, update, and manipulate tables and keys. A query result from a relational database may include data retrieved from different tables of the relational database.

Graph databases organize data using a graph data structure that includes a number of interconnected graph primitives. Examples of graph primitives include nodes, edges, and predicates, where a node stores data, an edge creates a relationship between two nodes, and a predicate is a semantic label assigned to an edge, which defines or describes the type of relationship that exists between the nodes connected by the edge. A node of a graph database may correspond to a table, a subset of a table, or set of rows and columns of different tables of a non-graph database. Another example of a graph primitive is a particular portion of a graph or a sub-graph, such as a specific pair of nodes plus an edge by which the nodes are connected. A graph query language is used to construct and execute queries on the graph database and to create, update, and manipulate components of a graph database. With a graph database, query results include a subset of the graph stored in the graph database; e.g., one or more graph primitives.

A distributed system may be organized according to an arrangement of computers on a network that is designed for query throughput, response time, reliability, scalability, or performance. For example, a distributed system may include multiple data centers, where each data center resides at a different physical, geographic location, and each data center contains a complete copy of the database. Data centers may receive updated copies of the database through a replication process. Each data center may include multiple clusters of server computers, and each cluster or server computer may include one or more machines. In a distributed system, portions of a database or an index may be logically divided into shards. The different shards may be stored in the same machine or on different machines of the distributed system.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIG. 1 is a block diagram illustrating at least one embodiment of a computing system in which aspects of this disclosure may be implemented.

DETAILED DESCRIPTION

Figure 2A:
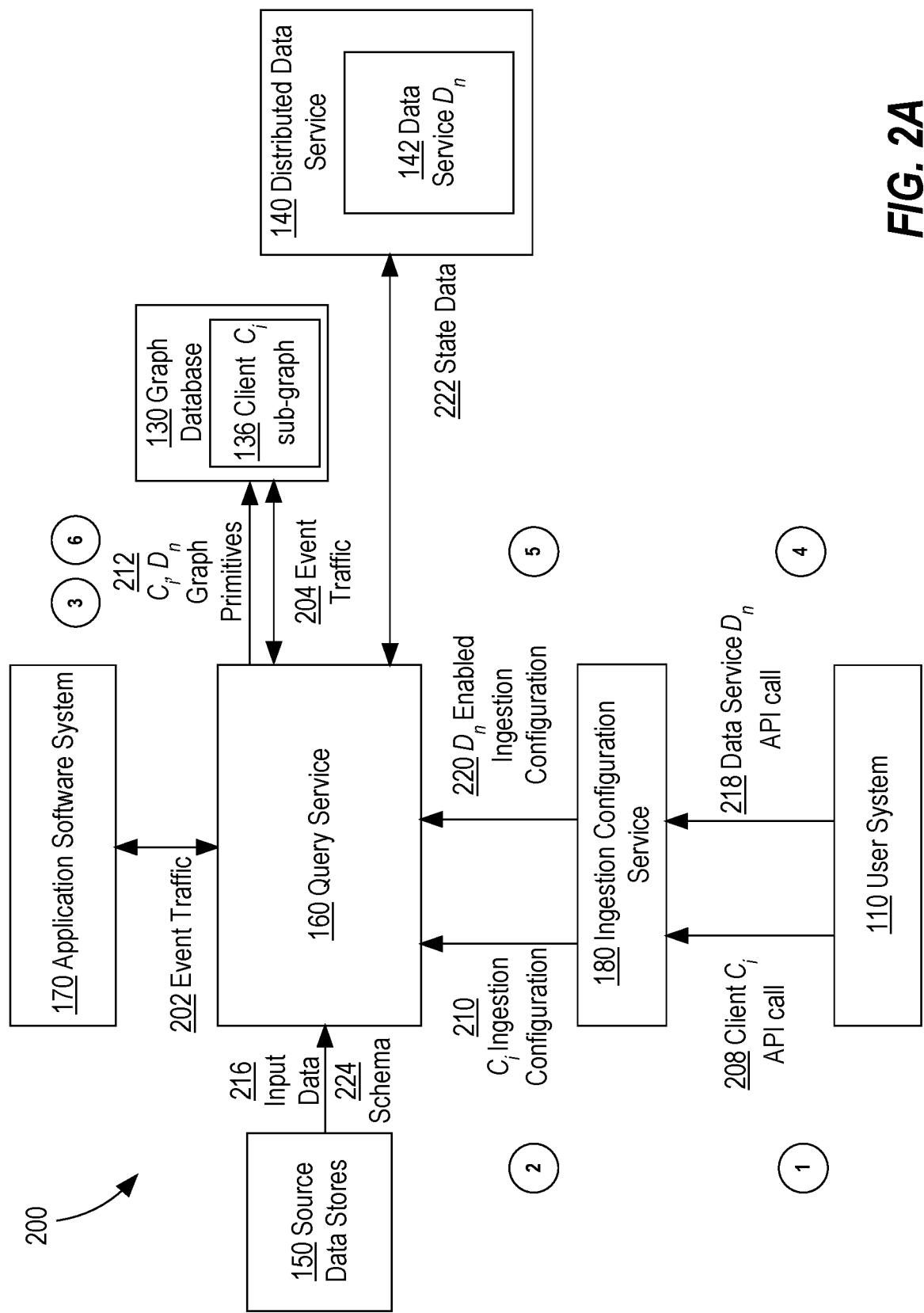
FIG. 2A is a flow diagram of a process that may be used to implement a portion of the computing system of FIG. 1.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

OVERVIEW

Network-based software applications often store and process massive amounts of data. For example, connections network systems, such as social media applications and applications based thereon, may create, store, query, and perform complex operations on billions of data records every day.

Network-based software applications often include search functionality that allows users to enter search queries to search for and retrieve data records that match the users' search criteria. An example of a search criterion is a keyword, such as an entity name, job title or skill. Example of data records include user profiles, job postings, news feed items, and comments. In applications that use or are based on a social graph, complicated operations may need to be performed to determine the correct set of query results. For instance, it may require several operations for the system to determine the first, second, or third-degree connections of an entity, particularly if the entity has a large number of connections. As another example, determining which of an entity's connections match a particular search query may require the system to perform a complicated set of operations, especially if the query contains multiple search criteria. To improve the efficiency of performing these and other operations, and to improve the speed at which accurate query results are retrieved from a database, a distributed graph database design may be used in which portions of the graph database and/or its indexes are stored across multiple different machines on a network. Storing data across multiple machines on a network increases parallelism and throughput and prevents bottlenecks.

A technical challenge is to ensure that appropriate portions (or data inputs) of a graph database index are properly configured to be distributed to the appropriate set of machines.

One prior approach that has been used to address this challenge involves a deployment schedule. In this approach, a human administrator creates the deployment schedule by writing computer programming code that specifies the manner in which a portion of the graph database is to be created and updated on a particular cluster or machine. In the prior approach, the deployment schedule is written using an imperative programming language. As such, the deployment schedule explicitly lists commands or steps that must be performed. The deployment schedule for a cluster typically needs to be propagated to each individual machine in the cluster.

A drawback of this prior approach is that changes to the deployment schedule require the manual editing of the code within the deployment schedule. Because the code can be quite complicated, there is a high risk of errors during the process of manually editing the deployment code.

Also, in the prior approach, the deployment schedule is specific to a particular machine or cluster. As a result, once edited, the updated deployment schedule needs to be propagated to all applicable machines or clusters. In distributed systems that include a large number of machines, for example hundreds or thousands of machines, updating the deployment schedule may be a very time consuming and laborious process.

Additionally, different clusters or machines may have different deployment schedules, so to avoid errors, propagation of deployment schedule changes requires detailed and complete knowledge of all of the machines or clusters to which the changes apply or do not apply. A mistake in propagation of a deployment schedule can result in, for example, incorrect data being loaded into the graph database or an incorrect index build at a particular machine or cluster. In summary, the prior deployment configuration approach has proven difficult to manage and subject to a high risk of costly errors.

As described in more detail below, the disclosed technologies improve upon prior approaches by replacing the complicated manually-coded deployment schedule, which is error-prone and hard to maintain, with a graph-based ingestion configuration metadata that is evaluated and applied by the graph database's query evaluator.

According to the disclosed technologies, a loading or updating of data from one or more source of truth data sources into a portion of a graph database may be referred to as an ingestion. Data can be consumed by or updated in a distributed graph database by establishing an ingestion pipeline between a machine, cluster, or data center on which at least a portion of the graph database resides and the source of truth data sources. An ingestion configuration establishes the ingestion pipeline and defines the manner in which the ingestion pipeline is to operate. Unlike the prior approaches that are tied to specific machines or clusters, the disclosed technologies allow for ingestion configurations to be established independently of any particular machines or clusters. Instead, ingestion configurations created using the disclosed technologies may be associated with different portions of the source of truth data sources that write data to the graph database.

According to the disclosed technologies, ingestion configurations are encoded directly into the graph database, as graph data, so that when an image of the graph database is built or propagated to a particular machine, cluster, or data center, the ingestion configuration is contained in the image and thereby also propagated to the same particular machine, cluster, or data center as part of the image. Because the image contains its own ingestion configuration, the image may be referred to as a self-describing image.

Another term for image as used herein is index. In the context of the disclosed technologies, an image is an index that facilitates retrieval of data stored in one or more source data stores. An image as used herein may contain a portion of data that has been ingested into the graph database from one or more source data stores. For example, an image can be defined as a set of ingestions. In the image, the ingested data is arranged according to the graph database structure in a manner that can be queried by the machine or cluster on which the image resides.

In this context, a process performed by a computer to transform source of truth data into a graph structure may be referred to as building an image. Transformation of data is necessary as the ingested data may be in a form that is not compatible with a graph database. An image that has been built can be copied from one physical or logical storage location to another. For instance, an image may be copied from one data center, cluster, or machine to another data center, cluster or machine. An image may be modified by writing a new graph primitive to the graph database and then rebuilding the image. As used herein, loading may refer to loading an image from non-volatile memory into volatile memory, and serving an image may refer to making a loaded image available for querying by network traffic. Serving an image may involve, for example, changing a value of a flag variable to indicate that the image is ready to accept queries from the network.

The self-describing image ensures traceability of the ingestion configuration across machines or clusters. Also, because the self-describing image can be queried, the ingestion configuration can be easily determined and evaluated to determine whether it is appropriate for a particular data center, cluster, or machine prior to loading, writing, or serving the image. In this way, the disclosed technologies enable and facilitate early detection of ingestion configuration errors and mismatches; thereby preventing ingestion configuration errors from being propagated to many other machines, including, for example, machines that are used to serve live network traffic.

Implementations of the disclosed technologies provide an ingestion configuration service configured at least partly in accordance with a declarative query language. A declarative query language allows users to express what data to retrieve, thus letting the query processing engine retrieve the data seamlessly. A declarative query language functions in a more general manner and involves giving broad instructions about what task is to be completed, rather than the specifics on how to complete the task. Examples of declarative query languages include prolog and SQL. Use of the declarative language simplifies the process of creating, modifying, and maintaining an ingestion configuration because it permits the ingestion configuration to be described in terms of the desired results without explicitly listing commands or steps that must be performed. As stated above, an ingestion configuration initially may be created independently of any particular machines or clusters. During initial creation or at a later time, the ingestion configuration may be applied to or enabled for one or more particular machines or clusters using simple declarative statements that are also encoded in the graph database.

As used herein, node may refer to a node or a vertex in a graph of a graph database and not to a computer in a network of computers. Data center as used herein may refer to a physical, geographic location of one or more machines or clusters. Cluster as used herein may refer to a logical grouping of one or more machines within a data center, or a logical grouping may be independent of the physical locations of the machines. Machine as used herein may refer to a physical machine, such as a server computer, or a virtual machine running on a server computer.

The above-described advantages and benefits are provided as examples. The disclosed technologies are not limited to these examples and may provide additional or different advantages and benefits than those described above.

Example Use Case

The disclosed technologies may be described with reference to the example use case of creating, modifying, and managing ingestion configurations for a distributed graph database in the context of a network application; for example, a social graph application such as a professional social network application.

Other Use Cases

The disclosed technologies are not limited to social graph applications but can be used to create, modify, and managing ingestion configurations for graph databases more generally. The disclosed technologies may be used by many different types of network applications in which graph-based ingestion configurations may improve data consistency, reliability, or performance, such as any application in which graph databases may be frequently queried and/or frequently updated.

Example Computing System

FIG. 1 illustrates a computing system in which embodiments of the features described in this document can be implemented. In the embodiment of FIG. 1, computing system 100 includes a user system 110, a network 120, a graph database 130, a distributed data service 140, a set of source data stores 150 (which are sources of truth), a query service 160, an application software system 170, and an ingestion configuration service 180.

User system 110 includes at least one computing device, such as a personal computing device, a server, a mobile computing device, or a smart appliance. User system 110 includes at least one software application, including a user interface 112, installed on or accessible by a network to a computing device. For example, user interface 112 may be or include a front-end portion of application software system 170.

User interface 112 is any type of user interface as described above. User interface 112 may be used to input search queries and view or otherwise perceive output that includes data retrieved by query service 160 and/or produced by application software system 170. For example, user interface 112 may include a graphical user interface and/or a conversational voice/speech interface that includes a mechanism for entering a search query and viewing query results and/or other digital content. Examples of user interface 112 include web browsers, command line interfaces, and mobile apps. User interface 112 as used herein may include application programming interfaces (APIs).

Graph database 130 is a graph database that contains data that may be retrieved and/or manipulated by query service 160 generate query results. In some implementations, portions of graph database 130 may be part of or accessed by or through another system, such as distributed data service 140. Data is ingested into graph database 130 and stored in a graph 132. Graph 132 includes a client $C_i$ sub-graph 136 for each client $C_i$ of a number of clients of graph database 130. Client $C_i$ sub-graph 136 contains a client $C_i$ ingestion configuration metadata 134.

Client $C_i$ ingestion configuration metadata 134 is configured to facilitate the ingestion of data from one or more source data stores 150 into graph 132 using the approaches described herein. Example implementations of client $C_i$ ingestion configuration metadata 134 are shown in the drawings that follow and are described in more detail below.

As used herein, client may correspond to a logical grouping of data stored in one or more source data stores 150. For example, a client may correspond to a particular type of query or to search criteria of a query that may be executed by query service 160 to retrieve a particular set of query results to be delivered to application software system 170. As such, a client's corresponding logical grouping of data needs to be searchable via graph database 130. The logical grouping of data to which a client corresponds includes one or more datasets.

As an example, 'connections' may be the name of a client. The connections client may have multiple datasets including a 'member to member connections' dataset, a 'member to company connections' dataset, and a 'member to follower connections' dataset. Each dataset of a client may consume data from one or more source data stores 150. For example, a dataset may consume data from only an offline source, only a nearline source, or both an offline source and a nearline source.

Distributed data service 140 stores portions of graph database 130 in a distributed manner. Distributed data service 140 includes a number of data services $D_n$ 142, where D denotes a tag or label that identifies a particular data service and n is a positive integer. As used herein, data service may refer to a physical, geographic grouping of machines, a logical grouping of machines, or a single machine. For example, a data service $D_n$ 142 may be a data center, a cluster, a group of clusters, or a machine. A data service $D_n$ 142 may store a complete copy of graph database 130 or only one or more portions of graph database 130.

Each data service $D_n$ 142 includes a corresponding image manager $M_n$ 144 and stores one or more self-describing images $I_{i,n}$ 146. Image manager $M_n$ 144 manages the images 146 that are stored on data service $D_n$ 142. For example, image manager $M_n$ 144 performs image copying, building, loading, writing, serving, and deleting operations. Image manager $M_n$ 144 also keeps track of the versions of images that have been copied to a data service $D_n$ 142, and built, loaded, written, served, and deleted on a data service $D_n$ 142. Image manager $M_n$ 144 stores information about the images received by and used on data service $D_n$ 142 locally, for example as state data for the data service $D_n$ 142.

A self-describing image $I_{i,n}$ 146 is an image that contains a client $C_i$ sub-graph 136, including a client $C_i$ ingestion configuration metadata 134, for each of i clients of graph database 130, where i is a positive integer. Thus, self-describing image $I_{i,n}$ 146 may contain client $C_i$ sub-graphs 136 for each and every client of graph database 130. Alternatively, self-describing image $I_{i,n}$ 146 may contain client $C_i$ sub-graphs 136 for only a subset of all of the clients of graph database 130.

Source data stores 150 store the source of truth data that is consumed by graph database 130. Source data stores 150 include one or more offline stores $Ox$ 152 and one or more nearline stores 154 $N_y$, where O and N are tags or labels that identify particular source data stores 150 and x and y are positive integers. As used herein, each of i, n, x, and y may have the same value or a different value and the value of any of i, n, x, and y may change over time.

An example of an offline store $Ox$ 152 is a source of truth data store implemented using a relational database. An example of a nearline store 154 $N_y$ is a real-time event stream such as a KAFKA event stream. Each of source data stores 150 stores data according to a schema that is different from the graph schema of graph database 130. For example, a source data store 150 may store data according to a non-graph schema such as a relational schema.

Source data stores 150 may reside on at least one persistent and/or volatile storage device that may reside within the same local network as at least one other device of computing system 100 and/or in a network that is remote relative to at least one other device of computing system 100. Thus, although depicted as being included in computing system 100, portions of source data stores 150 may be part of computing system 100 or accessed by computing system 100 over a network, such as network 120.

Query service 160 interprets and executes queries against graph database 130. Query service 160 also performs various logic operations on graph database 130. For example, query service 160 may create, update, or delete graph primitives from graph database 130. Portions of query service 160 may be part of or accessed by or through another system, such as distributed data service 140, application software system 170, or ingestion configuration service 180. Query service 160 may be implemented using a declarative query language.

Application software system 170 is any type of application software system that includes or utilizes functionality provided by query service 160. Examples of application software system 170 include but are not limited to connections network software, such as social media platforms, and systems that may or may not be based on connections network software, such as general-purpose search engines, job search software, recruiter search software, sales assistance software, advertising software, learning and education software, or any combination of any of the foregoing.

Ingestion configuration service 180 is an interface to query service 160 that facilitates the creation and modification of ingestion configurations for one or more clients as described in more detail below. Ingestion configuration service 180 is an API or includes a suite of APIs. Ingestion configuration service 180 may be implemented using a declarative programming language.

While not specifically shown, it should be understood that any of user system 110, graph database 130, distributed data service 140, source data stores 150, query service 160, application software system 170, and ingestion configuration service 180 includes an interface embodied as computer programming code stored in computer memory that when executed causes a computing device to enable bidirectional communication with any other of user system 110, graph database 130, distributed data service 140, source data stores 150, query service 160, application software system 170, or ingestion configuration service 180 using a communicative coupling mechanism. Examples of communicative coupling mechanisms include network interfaces, inter-process communication (IPC) interfaces and application program interfaces (APIs).

A client portion of application software system 170 may operate in user system 110, for example as a plugin or widget in a graphical user interface of a software application or as a web browser executing user interface 112. In an embodiment, a web browser may transmit an HTTP request over a network (e.g., the Internet) in response to user input that is received through a user interface provided by the web application and displayed through the web browser. A server running query service 160 and/or a server portion of application software system 170 may receive the input, perform at least one operation using the input, and return output using an HTTP response that the web browser receives and processes.

Each of user system 110, graph database 130, distributed data service 140, source data stores 150, query service 160, application software system 170, and ingestion configuration service 180 is implemented using at least one computing device that is communicatively coupled to electronic communications network 120. Any of user system 110, graph database 130, distributed data service 140, source data stores 150, query service 160, application software system 170, and ingestion configuration service 180 may be bidirectionally communicatively coupled by network 120. User system 100 as well as one or more different user systems (not shown) may be bidirectionally communicatively coupled to application software system 170, query service 160, or ingestion configuration service 180.

A typical user of user system 110 may be an administrator of graph database 130, an administrator of a distributed data service 140, an administrator of application software system 170, or an end user of application software system 170. User system 110 is configured to communicate bidirectionally with any of graph database 130, distributed data service 140, source data stores 150, query service 160, application software system 170, and ingestion configuration service 180 over network 120.

The features and functionality of user system 110, graph database 130, distributed data service 140, source data stores 150, query service 160, application software system 170, and ingestion configuration service 180 are implemented using computer software, hardware, or software and hardware, and may include combinations of automated functionality, data structures, and digital data, which are represented schematically in the figures. User system 110, graph database 130, distributed data service 140, source data stores 150, query service 160, application software system 170, and ingestion configuration service 180 are shown as separate elements in FIG. 1 for ease of discussion but the illustration is not meant to imply that separation of these elements is required. The illustrated systems, services, and data stores (or their functionality) may be divided over any number of physical systems, including a single physical computer system, and can communicate with each other in any appropriate manner.

Network 120 may be implemented on any medium or mechanism that provides for the exchange of data, signals, and/or instructions between the various components of computing system 100. Examples of network 120 include, without limitation, a Local Area Network (LAN), a Wide Area Network (WAN), an Ethernet network or the Internet, or at least one terrestrial, satellite or wireless link, or a combination of any number of different networks and/or communication links.

It should be understood that computing system 100 is just one example of an implementation of the technologies disclosed herein. While the description may refer to FIG. 1 or to "system 100" for ease of discussion, other suitable configurations of hardware and software components may be used to implement the disclosed technologies. Likewise, the particular embodiments shown in the subsequent drawings and described below are provided only as examples, and this disclosure is not limited to these exemplary embodiments.

Example Operation of Ingestion Configuration Service

FIG. 2A is a simplified flow diagram of an embodiment of operations and components of a computing system capable of performing aspects of the disclosed technologies. The operations of a flow 200 as shown in FIG. 2A can be implemented using processor-executable instructions that are stored in computer memory. For purposes of providing a clear example, the operations of FIG. 2A are described as performed by computing system 100, but other embodiments may use other systems, devices, or implemented techniques.

In FIG. 2A, event traffic 202 is exchanged between application software system 170 and query service 160. Event traffic 202 can include online, offline, and/or nearline communications of data and/or instructions over a network. For example, event traffic 202 can include data record updates, activity logs, queries, and/or query results. Query service 160 transforms event traffic 202 received from application software system 170 into a format that can be read and processed by graph database 130 (i.e., event traffic 204) and transforms event traffic 204 received from graph database 130 into a format that can be read and processed by application software system 170 (i.e., event traffic 202).

Data storage for graph database 130 is distributed across distributed data service 140. Query service 160 manages ingestions of data from source data stores 150 to distributed data service 140. In doing so, query service 160 encodes ingestion configurations created by ingestion configuration service 180 into graph database 130. FIG. 2A illustrates an example of the creation and modification of an ingestion configuration for a particular client $C_i$ and the transmission of an image containing that ingestion configuration to a particular data service $D_n$ 142 of distributed data service 140. While the creation and modification of an ingestion configuration should occur during loading time, such creation and modification can occur at the same time as query service 160 is handling event traffic 202, 204, or at other times.

To create an ingestion configuration for client ingestion configuration service 180 receives a client $C_i$ API call 208 from a user system 110 (step 1 in FIG. 2A). Client $C_i$ API call 208 may be issued by a human administrator or by an automated process or mechanism. Client $C_i$ API call 208 contains one or more arguments that indicate the desired ingestion configuration. Examples of arguments that may be included in client $C_i$ API call 208 include a unique client identifier and a path name of a storage location of a file that contains the ingestion configuration and the information for offline Ox store 152 and nearline store 154 $N_y$. An example of offline Ox store 152 is a Hadoop DFS path where the offline data files (to be ingested) are located. These "offline data files" are snapshots of the primary source-of-truth relational database tables. An example of nearline store 154 $N_y$ is the name of the Kafka topic from which nearline store 154 $N_y$ receives the real-time update stream. Ingestion configuration service 180 reads the ingestion configuration requested by client $C_i$ API call 208 into $C_i$ ingestion configuration 210 and transmits $C_i$ ingestion configuration 210 to query service 160 (step 2 of FIG. 2A).

An ingestion configuration is metadata that includes, for a particular client data identifying one or more source data store(s), instructions for connecting to the identified source data store(s) 150, transformation logic, and metadata. Transformation logic contained in an ingestion configuration provides the instructions for transforming input data 216 stored in a source data store 150 according to a schema 224 of the source data store 150 into a client $C_i$ sub-graph 136 that can be stored in graph database 130.

An ingestion configuration may also include one or more tags or labels that identify one or more data services $D_n$ to which the ingestion configuration applies. For example, an ingestion configuration may specify that a particular offline configuration should apply only to a certain data service $D_n$ and not to other data services. In this way, ingestion configuration service 180 allows an administrator to selectively customize ingestion configurations for different data services without having to write explicit code to implement the customized ingestion configurations. For example, a production cluster and a test machine each may have different ingestion configurations for the same client and these differences can be indicated in $C_i$ ingestion configuration 210 and encoded in graph database 130.

Figure 3A:
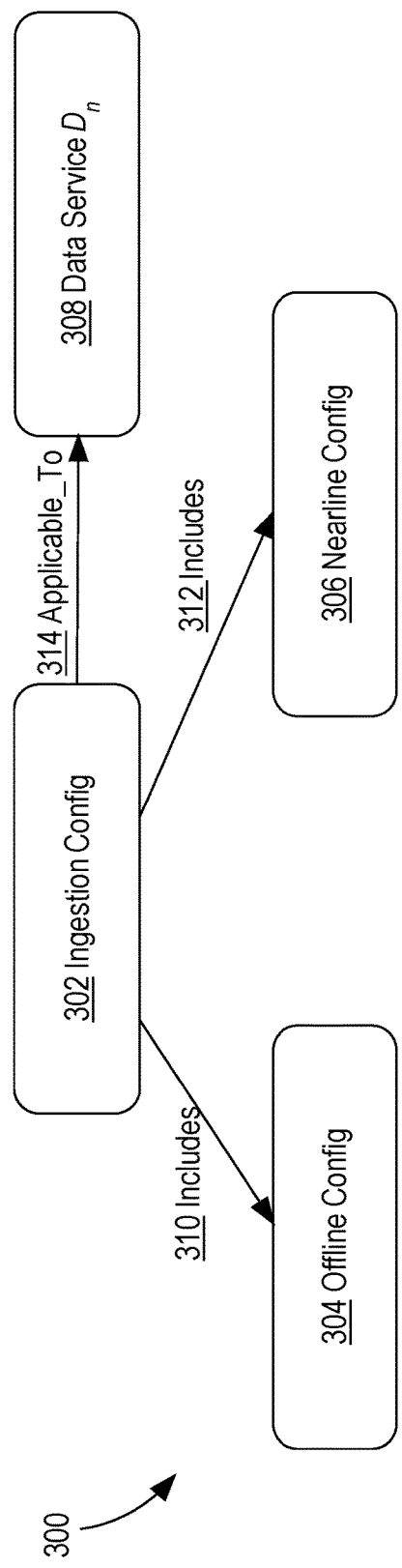
FIG. 3A and FIG. 3B are block diagrams illustrating examples of ingestion configurations that may be created or evaluated by a portion of the computing system of FIG. 1.
Figure 3B:
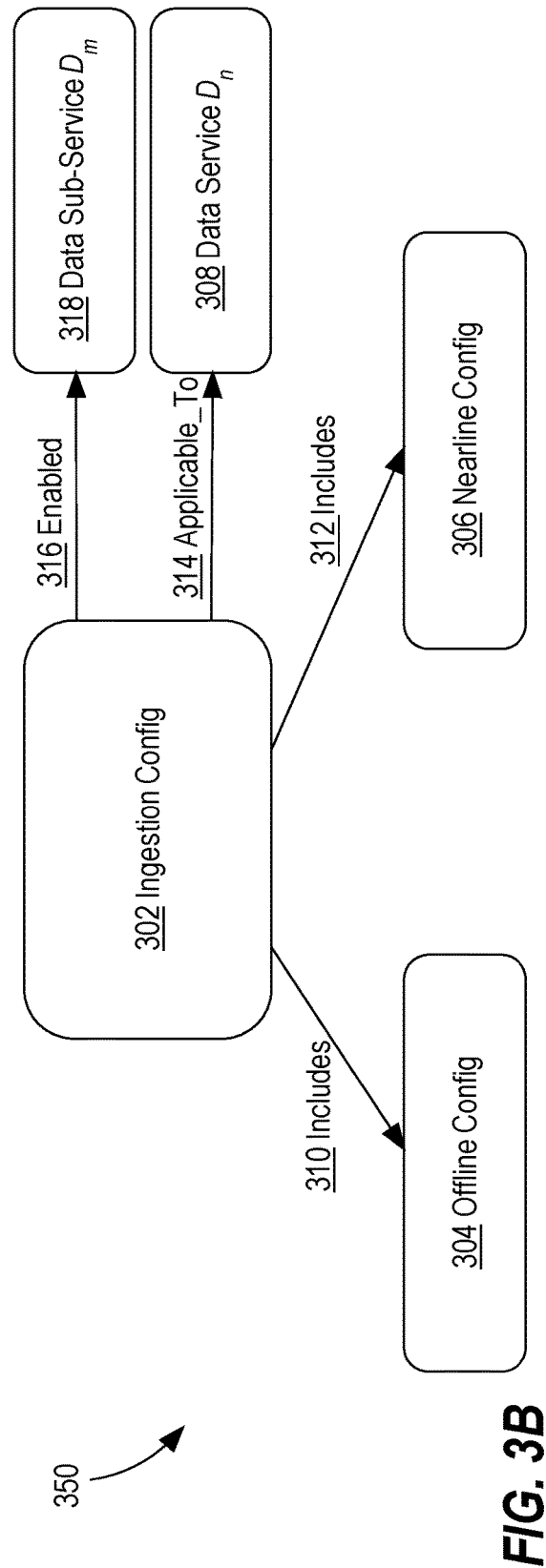

Ingestion configuration includes, for example, priority data that indicates an order of ingestion priority among multiple source data stores. Priority data may specify, for instance, that an ingestion from an offline data store should precede an ingestion from a nearline data store, or that an ingestion from a first nearline data store should precede an ingestion from a second nearline data store. Another example of metadata that may be contained in an ingestion configuration is a historical date/timestamp that indicates a starting point for consuming input data from a nearline source (e.g., to go back in time and consume nearline updates from that date/timestamp forward, in order to ensure data consistency). Yet another example of metadata that may be contained in an ingestion configuration is a flag name that facilitates the collection and aggregation of metrics. Additional examples of ingestion configurations are shown in FIG. 3A and FIG. 3B, described below.

Query service 160 reads $C_i$ ingestion configuration 210, transforms $C_i$ ingestion configuration 210 into one or more $C_i$ graph primitives 212, and stores the one or more $C_i$ graph primitives 212 in client $C_i$ sub-graph 136 (step 3 of FIG. 2A). An example of a $C_i$ graph primitive 212 is shown in FIG. 3A, described below.

At the same time or at a later time, ingestion configuration service 180 receives a data service $D_n$ API call 218 (step 4 of FIG. 2A). Data service $D_n$ API call 218 may be issued by a human administrator or by an automated process or mechanism. Data service $D_n$ API call 218 contains one or more arguments that indicate that a particular $C_i$ ingestion configuration 210 is enabled for a particular data service $D_n$. Differences between applicable and enabled ingestions are described below with reference to FIG. 2B. Examples of arguments that may be included in data service $D_n$ API call 218 include a data service $D_n$ identifier and a client identifier Ingestion configuration service 180 reads the ingestion configuration modification requested by data service $D_n$ API call 218 into $D_n$ enabled ingestion configuration 220 and transmits $D_n$ enabled ingestion configuration 220 to query service 160 (step 5 of FIG. 2A).

Query service 160 reads $D_n$ enabled ingestion configuration 220, transforms $D_n$ enabled ingestion configuration 220 into one or more $D_n$ graph primitives 212, and stores the one or more $D_n$ graph primitives 212 in client $C_i$ sub-graph 136 (step 6 of FIG. 2A). An example of a $D_n$ graph primitive 212 is shown in FIG. 3B, described below.

During an ingestion, query service 160 reads input data 216 and schema 224 from one or more source data stores 150 and transforms the input data 216 into a graph representation of input data 216, and stores the graph representation of input data 216 in graph database 130.

Since the ingestion configuration is encoded in graph database 130, when an image is built for a data service $D_n$, the ingestion configuration is contained in the image. Thus, when an image is built for the data service $D_n$, the ingestion configuration along with data that identifies its associated image and client(s), can be queried and extracted from the image and stored locally at data service $D_n$ in state data 222. This allows data service $D_n$ to evaluate images that it may receive from other sources against state data 222.

For example, if an image is copied to data service $D_n$ from another location, data service $D_n$ can query and extract the ingestion configuration for that image and compare it to its own state data 222. If the ingestion configuration for the image does not match state data 222, data service $D_n$ can determine the next appropriate action, which may be to reject the image or may be to determine that the image is acceptable and can be served by data service $D_n$ with zero or more modifications.

Example of Applicable and Enabled Ingestion Configurations

A client $C_i$ may have different configurations for different data services or may have a configuration that applies to a strict subset of services. An "applicable to" primitive establishes this relationship. For example, $C_{ix}$ is a configuration for client $C_i$ that is applicable to services $D_1$ and $D_2$, while $C_{iy}$ is a configuration for client $C_i$ that is applicable to only service $D_3$. However, CD, might not actually be enabled on both $D_1$ and $D_2$. The "enabled on" primitive tracks the services on which an applicable configuration is actually turned on. The set of "enabled on" services for a client configuration is a subset of the set of "applicable to" services for the client configuration. For example, although configuration CD, is applicable to services $D_1$ and $D_2$, $C_{ix}$ might only be enabled on $D_1$.

Figure 2B:
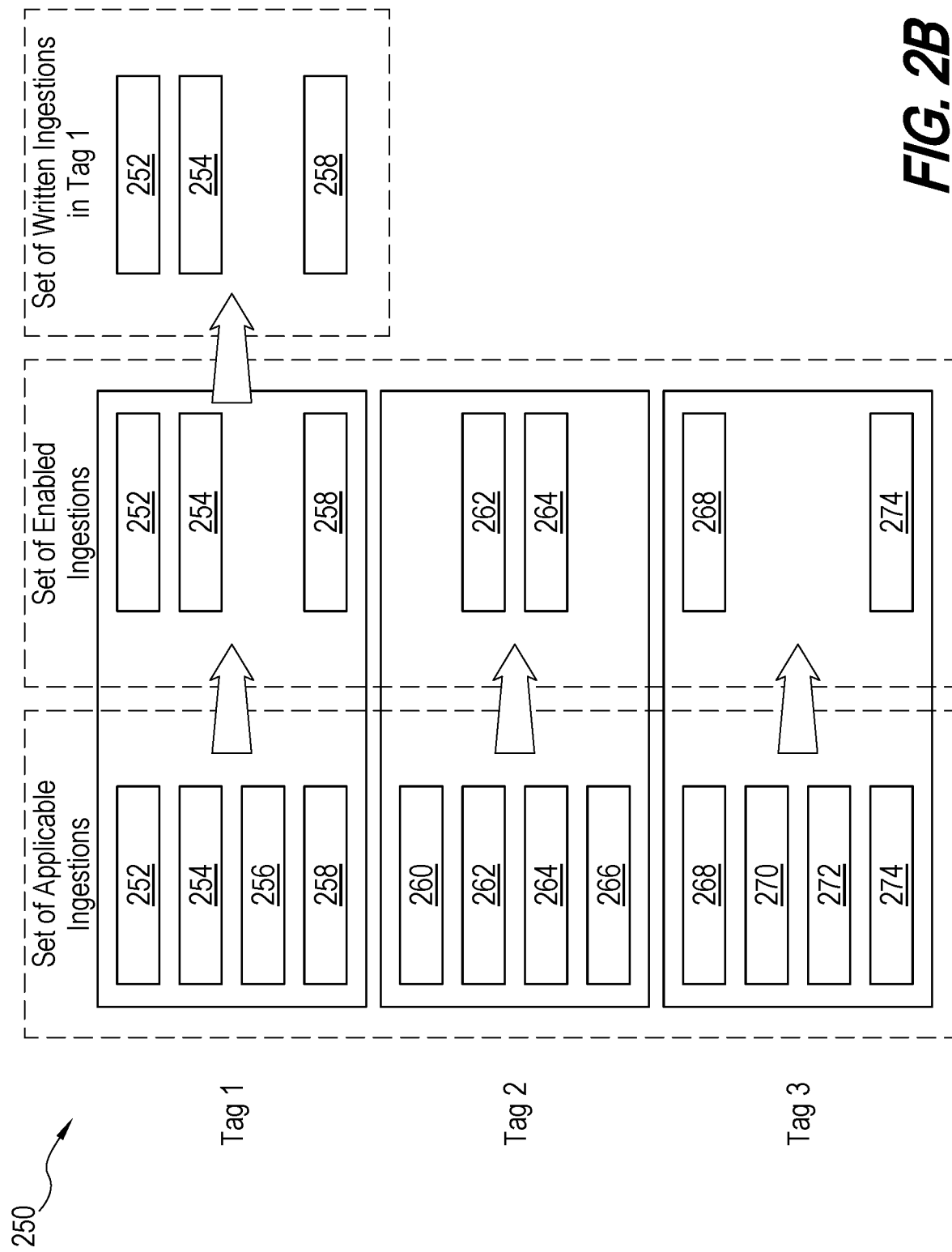
FIG. 2B illustrates an example of applicable and enabled ingestion configurations that may be created or evaluated by a portion of the computing system of FIG. 1.

FIG. 2B illustrates an example of a selectively adjustable ingestion configuration 250 that may be created or evaluated by a portion of the computing system of FIG. 1. Configuration 250 includes applicable and enabled ingestions for each of three tags: tag 1, tag 2, and tag 3. Each of tags 1, 2, and 3 corresponds to a physical, geographic and/or logical grouping of machines. For example, any of tag 1, tag 2 and tag 3 may correspond to a data center, a cluster, a grouping of clusters, or a machine. Configuration 250 includes 3 tags only as an example; any configuration may have any number of tags.

For purposes of illustration, suppose each of Tag 1, Tag 2, and Tag 3 corresponds to a different data center. In configuration 250, each data center has a different set of applicable ingestions, but in other configurations, some or all of the data centers may have the same set of applicable ingestions. Each applicable ingestion corresponds to a different client $C_i$. For example, each applicable ingestion 252, 254, 256, 258 specifies an ingestion configuration for a particular client $C_i$ and specifies that the ingestion configuration is applicable to all machines associated with Tag 1.

An ingestion configuration can be made applicable to a particular tag by adding an applicable-to graph primitive to a $C_i$ graph primitives 212, for example. Applicable-to information can be included in the initial version of an ingestion configuration, for example as part of $C_i$ ingestion configuration 210, or can be added later as, for example, $D_n$ enabled ingestion configuration 220.

A $C_i$ ingestion configuration 210 that is made applicable to all tags may be referred to as a base configuration. Including the applicable-to information in a base configuration for all applicable tags maximizes the flexibility of the base configuration once it is encoded in graph database 130. For example, if at a later time an administrator wants to enable an ingestion at a particular machine, they can do so by simply building or copying an image that includes the base configuration and, via ingestion configuration service 180, adding an enabled graph primitive indicating the machine for which the ingestion is to be enabled.

In configuration 250, ingestions 252, 254, and 258 have been enabled for Tag 1. As a result, when an image is written to Tag 1, only ingestions 252, 254, 258 will be included in the image. Similarly, while ingestions 260, 262, 264, 266 have been included in the set of applicable ingestions for Tag 2, only ingestions 262 and 264 are included in the set of enabled ingestions. For Tag 3, ingestions 268, 270, 272, and 274 are included in the set of applicable ingestions but only ingestions 268 and 274 are included in the set of enabled ingestions.

As shown in FIG. 2B, only the enabled ingestions are written to the image for a particular tag. Thus, an image built for Tag 1 includes only ingestions 252, 254, 258. If the image built for Tag 1 is attempted to be copied to Tag 3, there is a mismatch because ingestions 252, 254, 258 have not been enabled for Tag 3. Similarly, if an image built for Tag 2 is attempted to be copied to Tag 1, there is a mismatch because ingestions 262 and 264 have not been enabled for Tag 1. For instance, Tag 3 may be an experimental node and ingestions 268, 274 may be small samples of larger data sets. If Tag 1 is a production node that needs a complete set of data, using the image built for Tag 3 will cause the production system to have an incomplete dataset. In this way, the disclosed technologies can help ensure data consistency and prevent costly ingestion errors.

Example of Graph-Based Ingestion Configurations

FIG. 3A and FIG. 3B are block diagrams illustrating examples of ingestion configurations that may be created or evaluated by a portion of the computing system of FIG. 1.

As noted above, the disclosed technologies can represent an ingestion configuration as a logical graph of at least a portion of a graph database. The graph representation of the ingestion configuration data includes, for a client of the graph database, a specification for ingesting data from at least one source data store into the graph database.

As shown in FIGS. 3A and 3B, the graph representation of the ingestion configuration data includes at least two nodes, at least one edge, and at least one predicate. The at least two nodes include at least an offline configuration node and/or a nearline configuration node. An edge indicates a logical relationship between two nodes. A predicate includes a label for the logical relationship between the two nodes. The label relates to the specification for ingesting data from the at least one source data store into the graph database.

The specification for ingesting data from at least one source data store into the graph database includes ingestion configuration data for one or more offline data sources for the client and/or ingestion configuration data for one or more nearline data sources for the client.

The ingestion configuration data for an offline data sources or a nearline data source includes location data that identifies a physical or logical location of the at least one source data store for the client, such as a path name or a KAFKA topic name, metadata, and transformation logic. The metadata may specify an order of priority for writing data to the graph database for the client. The transformation logic may include instructions for transforming input data stored in one or more source data stores into a graph representation of the input data. The ingestion configuration data is written in a declarative form.

The graph representation of the ingestion configuration data may further include applicable data service data that identifies at least one data service to which the ingestion configuration data is applicable, enabled data service data that identifies at least one data service for which the ingestion configuration data is enabled. When an image is built for a data service, the logical graph is included in the image such that the graphical representation of the ingestion configuration is included in the image that is stored at the data service. This is what makes the image self-describing.

FIG. 3A and FIG. 3B illustrate graph representations of ingestion configurations, which may be created and encoded in graph database 130 by query service 160.

FIG. 3A illustrates an ingestion configuration 300. Ingestion configuration 300 includes four nodes: ingestion config 302, offline config 304, nearline config 306, and data service $D_n$ 308. Ingestion configuration 300 includes three edges: a first edge between ingestion config 302 and offline config 304, a second edge between ingestion config 302 and nearline config 306, and a third edge between ingestion config 302 and data service $D_n$ 308. Each edge has a predicate that describes the relationship between the two connected edges: includes 310 between ingestion config 302 and offline config 304, includes 312 between ingestion config 302 and nearline config 306, and applicable_to between ingestion config 302 and data service D 308. Ingestion config 302 can be modified by, for example, removing offline config 304, removing nearline config 306, removing data service $D_n$ 308, or adding another node similar to data service $D_n$ 308 but for a different data service, along with an applicable_to edge. These modifications are states that are described with the declarative language, and the query evaluator of the graph database makes the modifications to 302.

FIG. 3B illustrates an ingestion configuration 350. Ingestion configuration 350 is the same as ingestion configuration 300 except that ingestion configuration 350 includes an additional node and edge. More specifically, ingestion configuration 350 has added a new node, data sub-service $D_m$ 318, and a new edge, enabled 316. In the example of FIG. 3B, data sub-service $D_m$ is a subset of data service $D_n$. This indicates that ingestion config 302 is only enabled for the machine(s) in data sub-service $D_m$ and not for all of the machines in data service $D_n$.

Example Process for Creating an Ingestion Configuration

Figure 4:
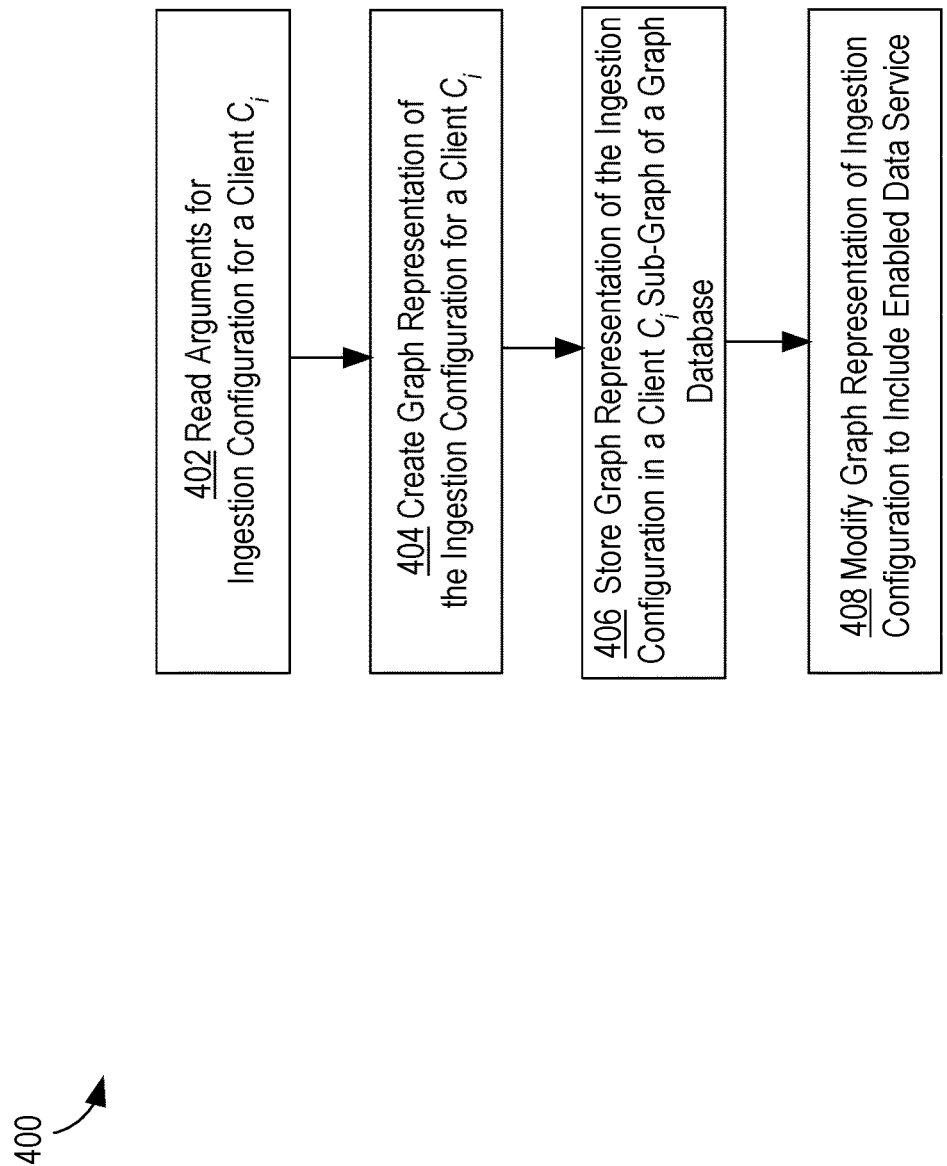
FIG. 4 is a flow diagram of a process that may be used to implement a portion of the computing system of FIG. 1

FIG. 4 is a flow diagram of a process that may be used to implement a portion of the computing system of FIG. 1. More specifically, flow 400 is an example of a process that may be used by, for example, query service 160 coordinating with ingestion configuration service 180 to create an ingestion configuration and encode the ingestion configuration into a graph database.

In operation 402, flow 400 reads ingestion configuration data for a client of a set of clients of the graph database. To do this, operation 402 may read one or more arguments of an API call. Reading the ingestion configuration data may include reading a declarative representation of ingestion configuration data for an offline data source for the client and/or ingestion configuration data for a nearline data source for the client.

Reading ingestion configuration data may include reading a declarative representation of any combination of any of location data that identifies a physical or logical location of a data source for the client, metadata that specifies an order of priority for writing data to the graph database for the client, transformation logic for transforming input data stored in the data source into a graph representation of the input data. Reading ingestion configuration data may include reading a declarative representation of applicable data service data that identifies at least one data service to which the ingestion configuration data is applicable and/or enabled data service data that identifies at least one data service for which the ingestion configuration data is enabled.

Reading ingestion configuration data for the client may be performed using an application programming interface (API) configured at least in part according to a declarative query language.

In operation 404, flow 400 creates a graph representation of the ingestion configuration read in operation 402. To do this, operation 402 may parse the ingestion configuration data into a graph primitive.

Creating the graph representation of the ingestion configuration data for the client may include transforming the ingestion configuration data into a graph primitive that includes at least two nodes, at least one edge, and at least one predicate; where an edge of the at least one edge indicates a logical relationship between two nodes of the at least two nodes, a predicate of the at least one predicate comprises a label for the logical relationship between the two nodes, and the label relates to an ingestion configuration, and the ingestion configuration includes a specification for ingesting input data from a non-graph data source into the graph database.

In operation 406, flow 400 stores the graph representation of the ingestion configuration data created by operation 404 in the graph database. To do this, operation 406 may encode the graph representation of the ingestion configuration in a client sub-graph of the graph database.

In operation 408, flow 400 modifies the graph representation of the ingestion configuration data to include an enabled data service. To do this, operation 408 may add a new edge to the graph representation of the ingestion configuration data and store the modified graph representation of the ingestion configuration data in the graph database. Operation 408 may include modifying the graph representation of the ingestion configuration data to indicate that the ingestion configuration data is enabled for at least one data service or modifying the graph representation of the ingestion configuration data to indicate that the ingestion configuration data is not enabled for at least one data service.

Following operation 408, flow 400 may provide the graph representation of the ingestion configuration data for the client to a data service; for example in response to a request from the data service. Following operation 408, an image containing the graph representation of the ingestion configuration data for the client may be created by the data service.

Flow 400 may include receiving the ingestion configuration data from at least one first device, creating the graph representation using at least one second device, and causing the graph representation to be stored in the graph database on at least one third device.

Example Process for Detecting an Ingestion Configuration Mismatch

Figure 5:
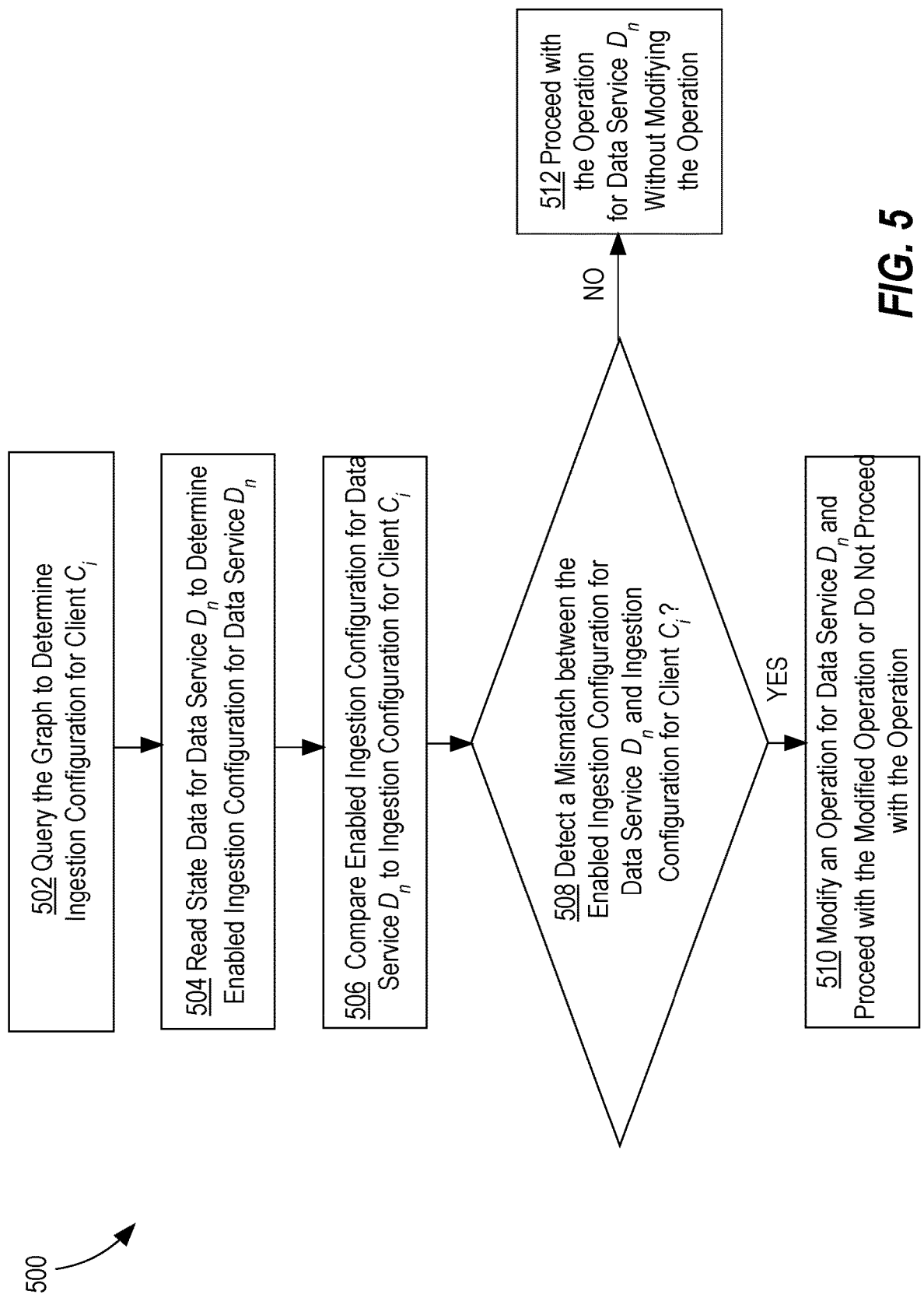
FIG. 5 is a flow diagram of a process that may be used to implement a portion of the computing system of FIG. 1.

FIG. 5 is a flow diagram of a process that may be used to implement a portion of the computing system of FIG. 1. More specifically, flow 500 is an example of a process that may be performed by a data service to evaluate ingestion configuration data before building, loading, writing, or serving an image at the data service.

In operation 502, flow 500 queries a graph database to determine an ingestion configuration for a client. Operation 502 may include querying an image of the graph database to determine, for a client of a number of clients of the graph database, ingestion configuration data applicable to a data service of a number of data services serving the graph database, where the client may correspond to at least one dataset arranged according to a non-graph or graph schema.

In operation 504, flow 500 reads state data for the data service to determine, for the client, enabled ingestion configuration data for the data service. Operation 504 may include reading locally stored ingestion configuration data for an image that has previously been built, loaded, written, or served on the data service.

In operation 506, flow 500 compares the ingestion configuration data enabled for the data service as determined in operation 504 to the ingestion configuration data applicable to the data service as determined in operation 502. Operation 506 may include evaluating ingestion configuration data for an offline data source for the client and/or evaluating ingestion configuration data for a nearline data source for the client.

For instance, operation 506 may include comparing applicable offline configuration data to enabled offline configuration data and/or comparing applicable nearline configuration data to enabled nearline configuration data. As another example, operation 506 may include evaluating location data that identifies a physical or logical location of a non-graph data source for the client and/or evaluating metadata that specifies an order of priority for writing data to the graph database for the client.

In operation 508, flow 500 determines whether there is a mismatch between the ingestion configuration data enabled for the data service and the ingestion configuration data applicable to the data service. Examples of a mismatch include an offline configuration applicable to but not enabled for the data service and/or a nearline configuration applicable to but not enabled for the data service.

Detecting the mismatch between the ingestion configuration data enabled for the data service and the ingestion configuration data applicable to the data service may include determining that an offline ingestion is applicable to the data service but is not enabled for the data service, or that a nearline ingestion is applicable to the data service but is not enabled for the data service, or that metadata contained in the ingestion configuration data enabled for the data service does not match metadata contained in the ingestion configuration data applicable to the data service, or any combination of any of the foregoing.

If operation 508 detects a mismatch, flow 500 proceeds to operation 510. In operation 510, flow 500 modifies an operation of the data service based on the detected mismatch. Modifying an operation of the data service based on the detected mismatch may include building an image on the data service, writing an image to a network-accessible storage location, deleting an image from the data service, copying an image to the data service from another storage location, or any combination of any of the foregoing.

If operation 508 does not detect a mismatch, flow 500 proceeds to operation 512. In operation 512, flow 500 proceeds with an operation for the data service without modifying the operation. For example, flow 500 may proceed to load, write, or serve the image containing the ingestion configuration data determined in operation 502.

Example Hardware Architecture

According to one embodiment, the techniques described herein are implemented by at least one special-purpose computing device. The special-purpose computing device may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, mobile computing devices, wearable devices, networking devices or any other device that incorporates hard-wired and/or program logic to implement the techniques.

Figure 6:
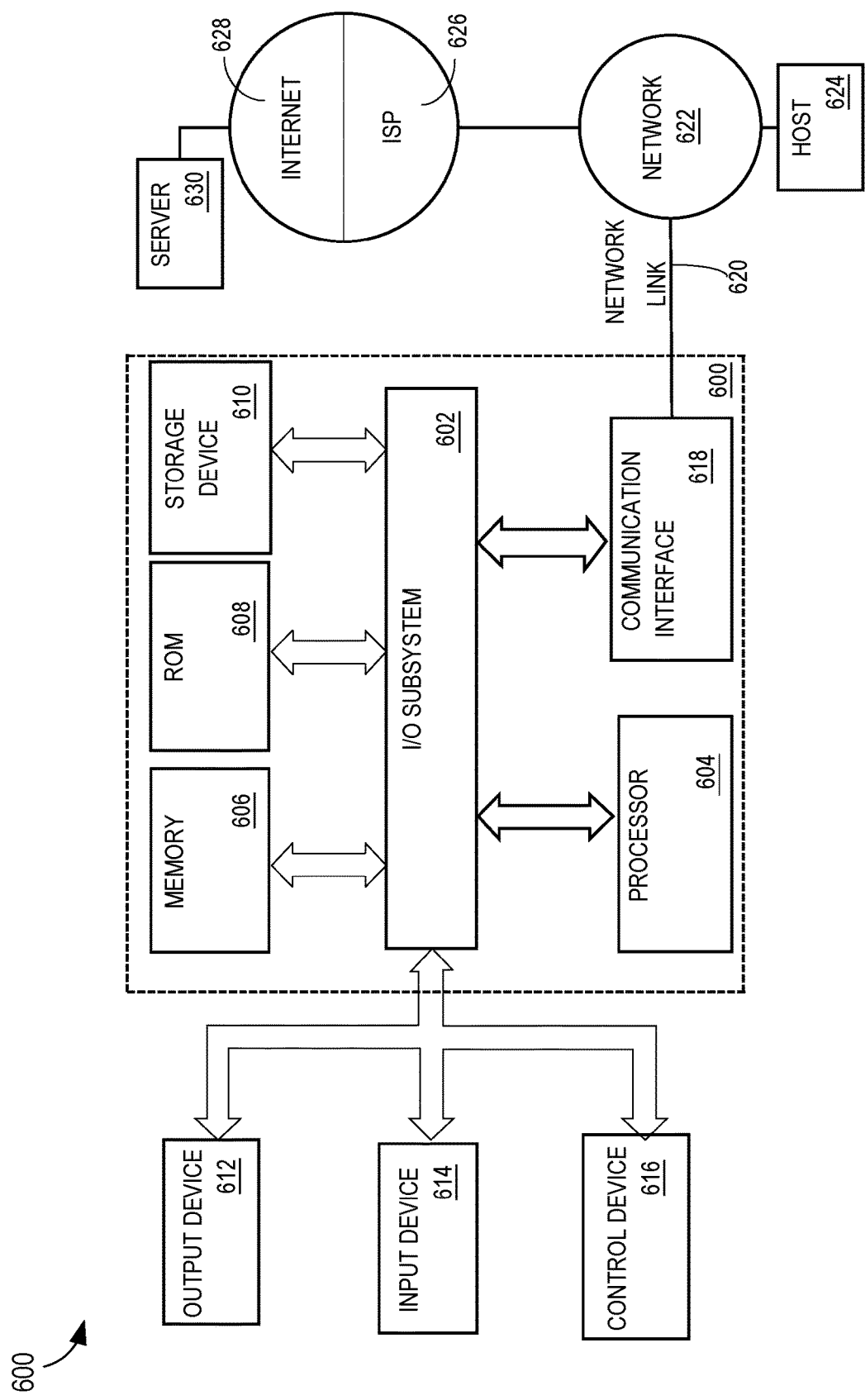
FIG. 6 is a block diagram illustrating an embodiment of a hardware system, which may be used to implement various aspects of the computing system of FIG. 1.

For example, FIG. 6 is a block diagram that illustrates a computer system 600 upon which an embodiment of the present invention may be implemented. Computer system 600 includes a bus 602 or other communication mechanism for communicating information, and a hardware processor 604 coupled with bus 602 for processing information. Hardware processor 604 may be, for example, a general-purpose microprocessor.

Computer system 600 also includes a main memory 606, such as a random-access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory computer-readable storage media accessible to processor 604, render computer system 600 into a special-purpose machine that is customized to perform the operations specified in the instructions.

Computer system 600 and further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to an output device 612, such as a display, such as a liquid crystal display (LCD) or a touchscreen display, for displaying information to a computer user, or a speaker, a haptic device, or another form of output device. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, at least one ASIC or FPGA, firmware and/or program logic which in combination with the computer system causes or programs computer system 600 to be a special-purpose machine. According to one embodiment, the techniques herein are performed by computer system 600 in response to processor 604 executing at least one sequence of instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying at least one sequence of instruction to processor 604 for execution. For example, the instructions may initially be carried on a magnetic disk or solid-state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated-services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through at least one network to other data devices. For example, network link 620 may provide a connection through local network 622 to a host computer 624 or to data equipment operated by an Internet Service Provider (ISP) 626. ISP 626 in turn provides data communication services through the world-wide packet data communication network commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 530 might transmit a requested code for an application program through Internet 628, ISP 626, local network 622 and communication interface 618. The received code may be executed by processor 604 as it is received, and/or stored in storage device 610, or other non-volatile storage for later execution.

ADDITIONAL EXAMPLES

Illustrative examples of the technologies disclosed herein are provided below. An embodiment of the technologies may include any of the examples or a combination of the described below.

In an example 1, a method includes reading ingestion configuration data for a client of a plurality of clients of the graph database; transforming the ingestion configuration data for the client from a declarative representation into a graph representation of the ingestion configuration data for the client; storing the graph representation of the ingestion configuration data for the client in the graph database; providing the graph representation of the ingestion configuration data for the client to at least one data service; wherein the at least one data service comprises one or more of (i) a physical grouping of at least one computing device configured to store at least a portion of the graph database, (ii) a logical grouping of at least one computing device configured to store at least a portion of the graph database, or (iii) a combination of (i) and (ii).

In an example 2 including the subject matter of example 1, wherein reading ingestion configuration data comprises reading a declarative representation of one or more of (i) ingestion configuration data for an offline data source for the client or (ii) ingestion configuration data for a nearline data source for the client, or (iii) a combination of (i) and (ii). In an example 3 including the subject matter of example 2 or example 1, wherein reading ingestion configuration data comprises reading a declarative representation of one or more of (i) location data that identifies a physical or logical location of a data source for the client, (ii) metadata that specifies an order of priority for writing data to the graph database for the client, or (iii) transformation logic for transforming input data stored in the data source into a graph representation of the input data, or (iv) a combination of at least two of (i), (ii), (iii). In an example 4 including the subject matter of any of examples 1-3, wherein reading ingestion configuration data comprises reading a declarative representation of one or more of (i) applicable data service data that identifies at least one data service to which the ingestion configuration data is applicable, (ii) enabled data service data that identifies at least one data service for which the ingestion configuration data is enabled, or (iii) a combination of (i) and (ii). In an example 5 including the subject matter of any of examples 1-4, wherein creating the graph representation of the ingestion configuration data for the client comprises transforming the ingestion configuration data into a graph primitive that comprises at least two nodes, at least one edge, and at least one predicate; wherein an edge of the at least one edge indicates a logical relationship between two nodes of the at least two nodes.

In an example 6 including the subject matter of example 5, wherein a predicate of the at least one predicate comprises a label for the logical relationship between the two nodes, and the label relates to an ingestion configuration, and the ingestion configuration comprises a specification for ingesting input data from a non-graph data source into the graph database.

In an example 7 including the subject matter of any of examples 1-6, further comprising reading ingestion configuration data for the client using an application programming interface (API) configured at least in part according to a declarative query language. In an example 8 including the subject matter of any of examples 1-7, further comprising (i) modifying the graph representation of the ingestion configuration data to indicate that the ingestion configuration data is enabled for the at least one data service or (ii) modifying the graph representation of the ingestion configuration data to indicate that the ingestion configuration data is not enabled for the at least one data service.

In an example 9, a method for evaluating an image of a graph database includes querying the image of the graph database to determine, for a client of a plurality of clients of the graph database, ingestion configuration data applicable to a data service of a plurality of data services serving the graph database, where the client corresponds to least one dataset arranged according to a non-graph schema; reading state data for the data service to determine, for the client, ingestion configuration data enabled for the data service; comparing the ingestion configuration data enabled for the data service to the ingestion configuration data applicable to the data service; detecting a mismatch between the ingestion configuration data enabled for the data service and the ingestion configuration data applicable to the data service; modifying an operation of the data service based on the detected mismatch, where the data service comprises one or more of (i) a physical grouping of at least one computing device configured to store at least a portion of the graph database, (ii) a logical grouping of at least one computing device configured to store at least a portion of the graph database, or (iii) a combination of (i) and (ii).

In an example 10 including the subject matter of example 9, wherein comparing the ingestion configuration data enabled for the data service to the ingestion configuration data applicable to the data service comprises one or more of (i) evaluating ingestion configuration data for an offline data source for the client, (ii) evaluating ingestion configuration data for a nearline data source for the client, or (iii) a combination of (i) and (ii).

In an example 11 including the subject matter of any of examples 9-10, wherein comparing the ingestion configuration data enabled for the data service to the ingestion configuration data applicable to the data service comprises one or more of (i) evaluating location data that identifies a physical or logical location of a non-graph data source for the client, (ii) evaluating metadata that specifies an order of priority for writing data to the graph database for the client, or (iii) a combination of (i) and (ii).

In an example 12 including the subject matter of any of examples 9-11, wherein detecting the mismatch between the ingestion configuration data enabled for the data service and the ingestion configuration data applicable to the data service comprises determining that one or more of (i) an offline ingestion is applicable to the data service but is not enabled for the data service, (ii) a nearline ingestion is applicable to the data service but is not enabled for the data service, (iii) metadata contained in the ingestion configuration data enabled for the data service does not match metadata contained in the ingestion configuration data applicable to the data service, or (iv) at least two of (i), (ii), (iii).

In an example 13 including the subject matter of any of examples 9-12, wherein modifying an operation of the data service based on the detected mismatch comprises one or more of (i) building an image on the data service, (ii) writing an image to a network-accessible storage location, (iii) deleting an image from the data service, (iv) copying an image to the data service from another storage location, or (v) at least two of (i), (ii), (iii), (iv).

In an example 14, a system comprises at least one processor and at least one computer memory operably coupled to the at least one processor, where the at least one computer memory is configured according to a logical graph of at least a portion of a graph database, the logical graph comprising a graph representation of ingestion configuration data, the graph representation including, for a client of a plurality of clients of the graph database, a specification for ingesting data from at least one source data store into the graph database.

In an example 15 including subject matter of example 14, wherein the graph representation of the ingestion configuration data comprises at least two nodes, at least one edge, and at least one predicate, and the at least two nodes includes one or more of (i) an offline configuration node, (ii) a nearline configuration node, or (iii) a combination of (i) and (ii).

In an example 16 including subject matter of any of examples 14-15, wherein the graph representation of the ingestion configuration data comprises at least two nodes, at least one edge, and at least one predicate; wherein an edge of the at least one edge indicates a logical relationship between two nodes of the at least two nodes, a predicate of the at least one predicate comprises a label for the logical relationship between the two nodes, and the label relates to the specification for ingesting data from the at least one source data store into the graph database.

In an example 17 including subject matter of any of examples 14-16, wherein the graph representation of the ingestion configuration data comprises one or more of (i) ingestion configuration data for an offline data source for the client, (ii) ingestion configuration data for a nearline data source for the client, or (iii) a combination of (i) and (ii).

In an example 18 including subject matter of any of examples 14-17, wherein the graph representation of the ingestion configuration data comprises one or more of (i) location data that identifies a physical or logical location of the at least one source data store for the client, (ii) metadata that specifies an order of priority for writing data to the graph database for the client, (iii) transformation logic for transforming input data stored in the at least one source data store into a graph representation of the input data, or (iv) at least two of (i), (ii), (iii).

In an example 19 including subject matter of any of examples 14-18, wherein the graph representation of the ingestion configuration data comprises one or more of (i) applicable data service data that identifies at least one data service to which the ingestion configuration data is applicable, (ii) enabled data service data that identifies at least one data service for which the ingestion configuration data is enabled, or (iii) a combination of (i) and (ii).

In an example 20 including subject matter of example 19, wherein the logical graph is included in an image of at least a portion of the graph database and the image is stored at a data service of the at least one data service.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions set forth herein for terms contained in the claims may govern the meaning of such terms as used in the claims. No limitation, element, property, feature, advantage or attribute that is not expressly recited in a claim should limit the scope of the claim in any way. The specification and drawings are to be regarded in an illustrative rather than a restrictive sense.

Terms such as "computer-generated" and "computer-selected" as may be used herein may refer to a result of an execution of one or more computer program instructions by one or more processors of, for example, a server computer, a network of server computers, a client computer, or a combination of a client computer and a server computer.

As used here, "online" may refer to a particular characteristic of a connections network-based system. For example, many connections network-based systems are accessible to users via a connection to a public network, such as the Internet. However, certain operations may be performed while an "online" system is in an offline state. As such, reference to a system as an "online" system does not imply that such a system is always online or that the system needs to be online in order for the disclosed technologies to be operable.

As used herein the terms "include" and "comprise" (and variations of those terms, such as "including," "includes," "comprising," "comprises," "comprised" and the like) are intended to be inclusive and are not intended to exclude further features, components, integers or steps.

Various features of the disclosure have been described using process steps. The functionality/processing of a given process step potentially could be performed in different ways and by different systems or system modules. Furthermore, a given process step could be divided into multiple steps and/or multiple steps could be combined into a single step. Furthermore, the order of the steps can be changed without departing from the scope of the present disclosure.

It will be understood that the embodiments disclosed and defined in this specification extend to alternative combinations of the individual features mentioned or evident from the text or drawings. These different combinations constitute various alternative aspects of the embodiments.

What is claimed is:

1. A method comprising:
    reading ingestion configuration data for a client of a plurality of clients of a graph database, wherein the client corresponds to a logical grouping of data stored in at least one source data store;
    transforming the ingestion configuration data for the client from a declarative representation into a graph representation of the ingestion configuration data for the client;
    encoding the graph representation of the ingestion configuration data for the client into the graph database to enable the creation of a self-describing image of the graph database; and
    using the self-describing image of the graph database to evaluate an ingestion configuration for at least one data service of the distributed data service by:
        comparing ingestion configuration data enabled for the at least one data service to ingestion configuration data applicable to the at least one data service;
        detecting a mismatch between the ingestion configuration data enabled for the at least one data service and the ingestion configuration data applicable to the at least one data service; and
        modifying an operation of the at least one data service based on the detected mismatch, wherein the at least one data service comprises one or more of (i) a physical grouping of at least one computing device configured to store at least a portion of the graph database, (ii) a logical grouping of at least one computing device configured to store at least a portion of the graph database, or (iii) a combination of (i) and (ii).

2. The method of claim 1, wherein reading ingestion configuration data comprises reading a declarative representation of one or more of (i) ingestion configuration data for an offline data source for the client or (ii) ingestion configuration data for a nearline data source for the client, or (iii) a combination of (i) and (ii).

3. The method of claim 1, wherein reading ingestion configuration data comprises reading a declarative representation of one or more of (i) location data that identifies a physical or logical location of a data source for the client, (ii) metadata that specifies an order of priority for writing data to the graph database for the client, or (iii) transformation logic for transforming input data stored in the data source into a graph representation of the input data, or (iv) a combination of at least two of (i), (ii), (iii).

4. The method of claim 1, wherein reading ingestion configuration data comprises reading a declarative representation of one or more of (i) applicable data service data that identifies at least one data service to which the ingestion configuration data is applicable, (ii) enabled data service data that identifies at least one data service for which the ingestion configuration data is enabled, or (iii) a combination of (i) and (ii).

5. The method of claim 1, wherein creating the graph representation of the ingestion configuration data for the client comprises transforming the ingestion configuration data into a graph primitive that comprises at least two nodes, at least one edge, and at least one predicate; wherein an edge of the at least one edge indicates a logical relationship between two nodes of the at least two nodes.

6. The method of claim 5, wherein a predicate of the at least one predicate comprises a label for the logical relationship between the two nodes, and the label relates to an ingestion configuration, and the ingestion configuration comprises a specification for ingesting input data from a non-graph data source into the graph database.

7. The method of claim 1, further comprising reading ingestion configuration data for the client using an application programming interface (API) configured at least in part according to a declarative query language.

8. The method of claim 1, further comprising (i) modifying the graph representation of the ingestion configuration data to indicate that the ingestion configuration data is enabled for the at least one data service or (ii) modifying the graph representation of the ingestion configuration data to indicate that the ingestion configuration data is not enabled for the at least one data service.

9. The method of claim 1, further comprising:
querying the self-describing image of the graph database to determine, for a client of a plurality of clients of the graph database, the ingestion configuration data applicable to a data service of a plurality of data services serving the graph database, wherein the client corresponds to least one dataset arranged according to a non-graph schema; and
reading state data for the data service to determine, for the client, the ingestion configuration data enabled for the data service.

10. The method of claim 9, wherein comparing the ingestion configuration data enabled for the data service to the ingestion configuration data applicable to the data service comprises one or more of (i) evaluating ingestion configuration data for an offline data source for the client, (ii) evaluating ingestion configuration data for a nearline data source for the client, or (iii) a combination of (i) and (ii).

11. The method of claim 9, wherein comparing the ingestion configuration data enabled for the data service to the ingestion configuration data applicable to the data service comprises one or more of (i) evaluating location data that identifies a physical or logical location of a non-graph data source for the client, (ii) evaluating metadata that specifies an order of priority for writing data to the graph database for the client, or (iii) a combination of (i) and (ii).

12. The method of claim 9, wherein detecting the mismatch between the ingestion configuration data enabled for the data service and the ingestion configuration data applicable to the data service comprises determining that one or more of (i) an offline ingestion is applicable to the data service but is not enabled for the data service, (ii) a nearline ingestion is applicable to the data service but is not enabled for the data service, (iii) metadata contained in the ingestion configuration data enabled for the data service does not match metadata contained in the ingestion configuration data applicable to the data service, or (iv) at least two of (i), (ii), (iii).

13. The method of claim 9, wherein modifying an operation of the data service based on the detected mismatch comprises one or more of (i) building an image on the data service, (ii) writing an image to a network-accessible storage location, (iii) deleting an image from the data service, (iv) copying an image to the data service from another storage location, or (v) at least two of (i), (ii), (iii), (iv).

14. The method of claim 1, further comprising:
configuring at least one computer memory according to a logical graph of at least a portion of the graph database, wherein (i) the logical graph comprises a graph representation of ingestion configuration data, and (ii) the graph representation of the ingestion configuration data includes, for a client of a plurality of clients of the graph database, wherein the client corresponds to at least one dataset arranged according to a non-graph schema, a specification for ingesting data from at least one source data store into the graph database.

15. The method of claim 14, wherein the graph representation of the ingestion configuration data comprises at least two nodes, at least one edge, and at least one predicate, and the at least two nodes includes one or more of (i) an offline configuration node, (ii) a nearline configuration node, or (iii) a combination of (i) and (ii).

16. The method of claim 14, wherein the graph representation of the ingestion configuration data comprises at least two nodes, at least one edge, and at least one predicate, wherein an edge of the at least one edge indicates a logical relationship between two nodes of the at least two nodes, a predicate of the at least one predicate comprises a label for the logical relationship between the two nodes, and the label relates to the specification for ingesting data from the at least one source data store into the graph database.

17. The method of claim 14, wherein the graph representation of the ingestion configuration data comprises one or more of (i) ingestion configuration data for an offline data source for the client, (ii) ingestion configuration data for a nearline data source for the client, or (iii) a combination of (i) and (ii).

18. The method of claim 14, wherein the graph representation of the ingestion configuration data comprises one or more of (i) location data that identifies a physical or logical location of the at least one source data store for the client, (ii) metadata that specifies an order of priority for writing data to the graph database for the client, (iii) transformation logic for transforming input data stored in the at least one source data store into a graph representation of the input data, or (iv) at least two of (i), (ii), (iii).

19. The method of claim 14, wherein the graph representation of the ingestion configuration data comprises one or more of (i) applicable data service data that identifies at least one data service to which the ingestion configuration data is applicable, (ii) enabled data service data that identifies at least one data service for which the ingestion configuration data is enabled, or (iii) a combination of (i) and (ii).

20. The method of claim 14, wherein the logical graph is included in an image of at least a portion of the graph database and the image is stored at a data service of the at least one data service.

* * * * *